United States Patent [19]

Barrow

[11] 4,236,291

[45] Dec. 2, 1980

[54] BEARING CARRIER PULLER FOR OUTBOARD MOTORS

[76] Inventor: Randall G. Barrow, 343 Marianna Ave., North Fort Myers, Fla. 33903

[21] Appl. No.: 68,149

[22] Filed: Aug. 20, 1979

[51] Int. Cl.³ .................................... B23P 19/04

[52] U.S. Cl. .................................... 29/256; 29/263

[58] Field of Search .................... 29/256, 263, 264; 254/67, 98

[56] References Cited

U.S. PATENT DOCUMENTS

| | | | |
|---|---|---|---|
| 1,465,124 | 8/1923 | Gardner, Jr. | 29/263 |
| 1,468,777 | 9/1923 | Edwards | 29/263 |
| 3,146,522 | 9/1964 | Wright | 29/256 |
| 3,579,796 | 5/1971 | Fillion | 29/263 |
| 4,060,884 | 12/1977 | Hamilton | 29/256 |

FOREIGN PATENT DOCUMENTS

| | | | |
|---|---|---|---|
| 687423 | 2/1953 | United Kingdom | 29/263 |

*Primary Examiner*—James G. Smith
*Attorney, Agent, or Firm*—Alfred E. Wilson

[57] ABSTRACT

A bearing carrier puller for outboard motors including a generally bell shaped puller block, the large end face of which provides a plurality of concentric grooves for selective seated engagement about a peripheral ridge defining an opening about the propeller shaft in the lower unit of an outboard motor. An elongated exteriorly threaded sleeve extends through the bell shaped puller block with an inner end thereof seated against the thrust hub of the propeller shaft and a nut is threaded on the sleeve outwardly of the smaller outer end of the puller block with a thrust washer interposed therebetween. Outwardly of the nut a ring member is secured to the sleeve by a plurality of set screws and an elongated handle extends radially outwardly from the ring for abutting engagement with an above portion of the motor housing. The threaded end portion of the propeller shaft extends outwardly of the sleeve and said sleeve is secured about the outer end of the propeller shaft by a washer and nut engaged on the threaded end portion. A suitable wrench is engaged on the sleeve nut which is turned clockwisely, the elongated handle locks against the lower unit housing confining the threaded sleeve to axial movement only, thereby pulling the propeller shaft, bearing carrier and reverse gear free of its secured engagement in the housing.

5 Claims, 5 Drawing Figures

BEARING CARRIER PULLER FOR OUTBOARD MOTORS

BACKGROUND OF THE PRESENT INVENTION

The present invention pertains to a bearing puller for outboard motors and more particularly to a tool of this nature which is secured in a circumferential disposition about the exposed outer end of the propeller shaft of an outboard motor after the propeller and lower unit cover nut has been removed. Means are provided to exert an axially outwardly centered force to the outer screw threaded end of the propeller shaft to remove said shaft, bearing carrier and reverse gear.

As currently practiced, a slide hammer assembly is employed. The slide hammer has long puller jaws which are employed to hook over radially extending flanges within the bearing carrier chamber of the lower unit, the carrier is pulled out by utilizing the slide hammer, sequentially tapping on one side and then the other to exert a pull on these bearing flanges. This operation often results in a cocking of the bearing carrier and frequently the radially inwardly extending flanges break off. It is then necessary to chisel the unit out, a time consuming and wasteful operation.

Therefore one of the principal objects of the present invention is to provide a tool which surrounds the extended propeller carrying end of the propeller shaft of an outboard motor after the propeller and the lower unit cover nut have been removed and to provide means to actuate the tool in a manner whereby a circumferentially uniform pressure is exerted between the propeller shaft and a housing lip surrounding the shaft, which pressure provides an axially centered force to withdraw the propeller shaft, bearing housing and reverse gear from the lower unit housing without causing damage thereto.

Another object of the invention is to provide such a tool which is applicable for use with various sizes of motors on most through hub exhaust lower units of both outboard and inboard-outboard types of motors.

DETAILED DESCRIPTION OF THE DRAWINGS

Figure 1:
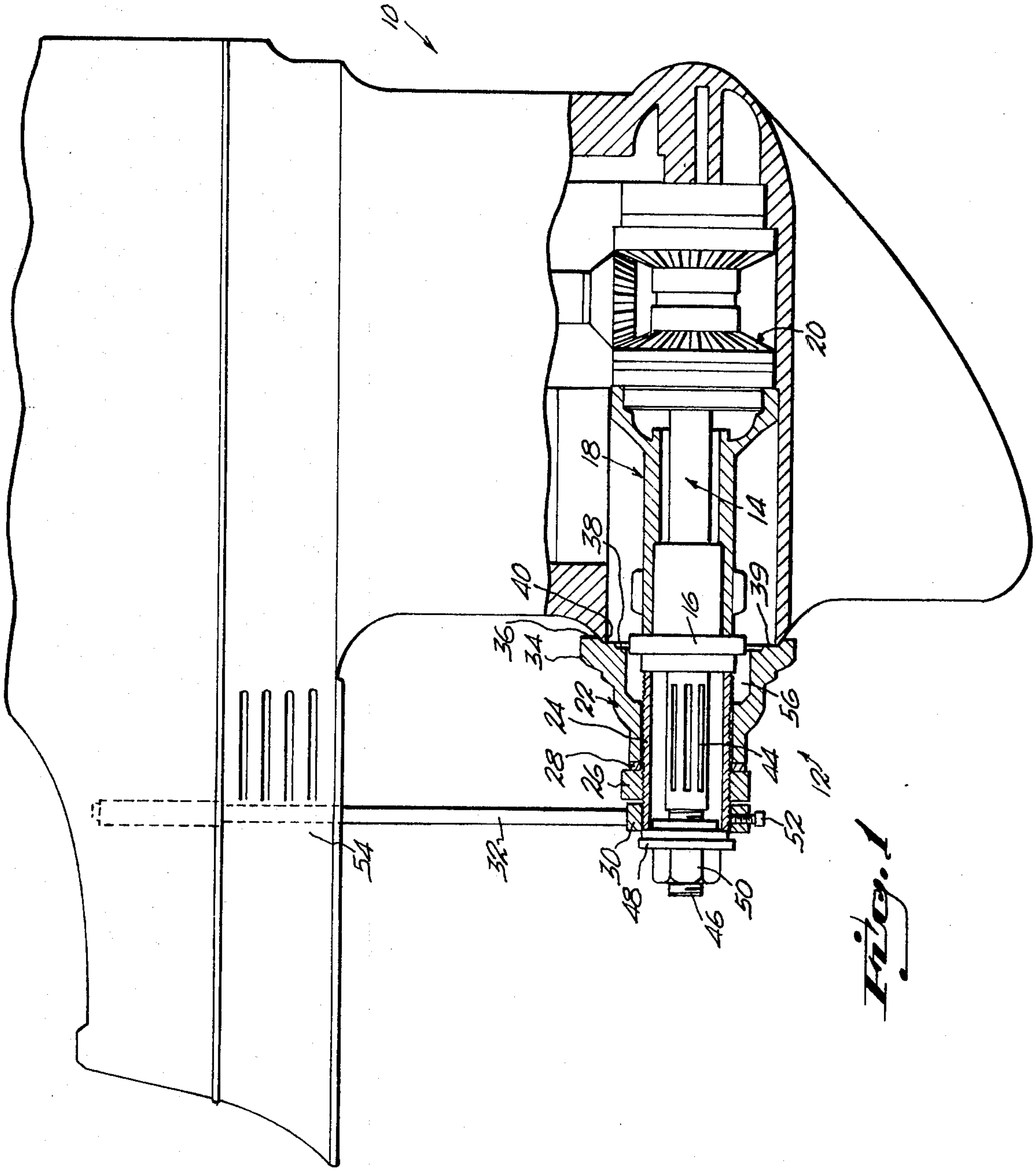
FIG. 1 is a fragmentary illustration of a typical lower unit of an outboard motor, partially shown in section and with the puller tool of the present invention operably engaged thereon and illustrated in cross section.
Figure 2:
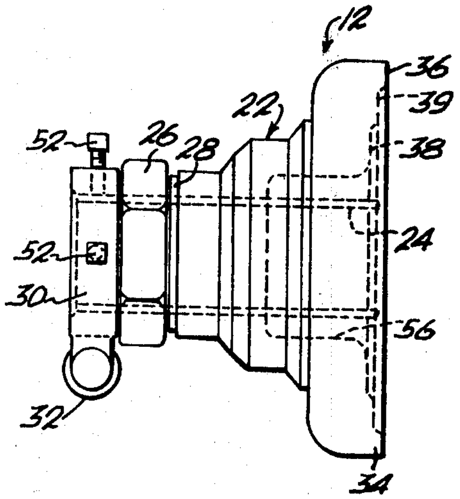
FIG. 2 is a bottom elevational view of the puller tool of the present invention.

With reference to the drawings and particularly to FIG. 1, the lower unit of a typical outboard motor, shown partially in cross section, is indicated generally at 10, with the puller tool assembly of the present invention, designated generally at 12, operably engaged thereon with the propeller and lower unit cover nut removed. The conventional propeller shaft is designated generally at 14, the thrust hub thereof at 16, bearing carrier 18 and reverse gear 20, these elements are illustrated in their assembled operating positions and various structural details of the lower unit have been omitted or simplified for the sake of clarity. The present invention pertains to the puller tool 12, the purpose of which is to safely and easily dislodge the above described assembly and will hereinafter be referred to as a bearing carrier puller, the propeller shaft 14, and reverse gear 20 are in assembly with said bearing carrier 18.

The bearing carrier puller 12 includes a generally bell shaped puller block 22, slidably engaged over an exteriorly threaded sleeve 24. A nut 26 is threaded on sleeve 24 outwardly of puller block 22 with a thrust washer 28 interposed therebetween. Outwardly of the nut 26 a ring 30, normally loosely disposed about an outer end portion of threaded sleeve 24, includes an elongated radially outwardly extending abutment handle 32.

Figure 3:
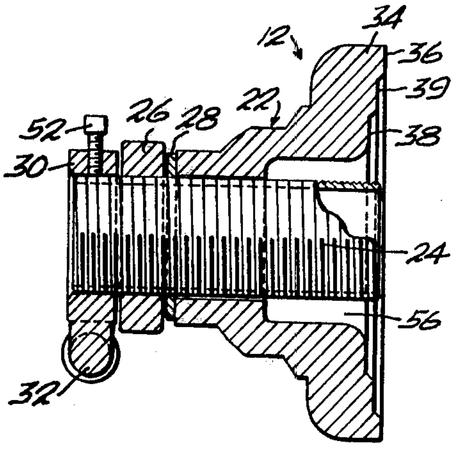
FIG. 3 is a cross sectional view taken along line 3—3 of FIG. 4.
Figure 5:
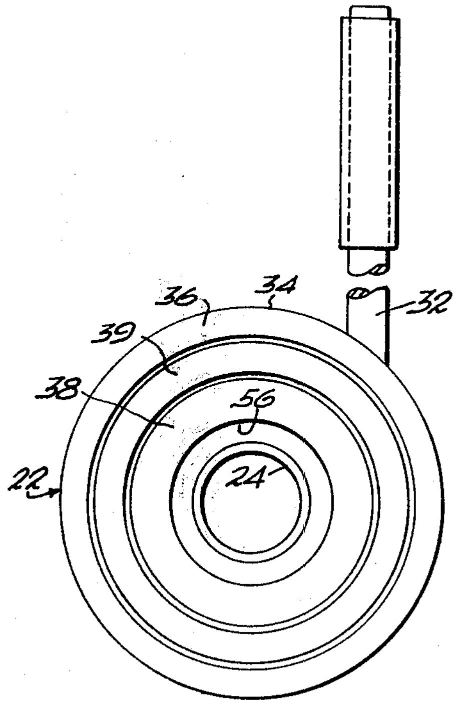
FIG. 5 is a plan view thereof as seen from the right side of FIG. 1.

In use, as illustrated in FIG. 1, the enlarged open mouth end 34 of the bell shaped block 22 defines an inner annular face 36 provided with a plurality of concentric annular recesses or grooves such as 38, 39 as best illustrated in FIGS. 3 and 5. Recess 39 as seen in FIG. 1 engages over the annular flared opening or lip 40 conventionally defined in the lower units of outboard motors or outdrive units of inboard-outboard motors. Two or more recesses or grooves 38, 39 are preferable to accommodate motors of different horsepower sizes.

With the bell shaped block so positioned the threaded sleeve 24 is disposed in abutment with the thrust hub 16 of propeller shaft 14 and is of a length somewhat shorter than the propeller carrier portion 44 of shaft 14 to permit the threaded distal end 46 thereof to extend partially therebeyond for the reception of a washer 48 and nut 50. Nut 50 is tightened to securely confine the threaded sleeve 24 between washer 48 and thrust hub 16.

Figure 4:
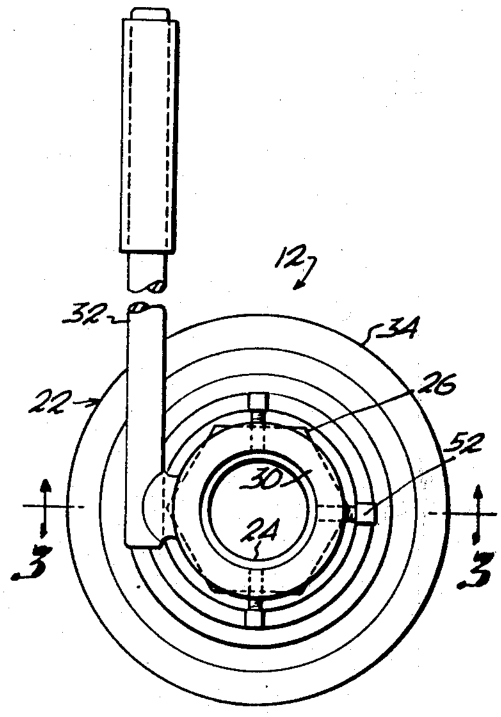
FIG. 4 is a plan view thereof as seen from the left side of FIG. 1.

As best illustrated in FIG. 4, a plurality of set screws 52, engaged through ring 30, are set to securely lock the ring 30 to the sleeve 24. Any appropriate type of conventional wrench is then applied to nut 26 which is turned clockwisely, with right hand threads. The initial turning of nut 26 will rotate the sleeve 24 and ring 30 until handle 32 locks against portion 54 of the motor housing. Subsequent turning of nut 26 will cause the threaded sleeve 24 to travel axially outwardly along the axis of propeller shaft 14, causing the withdrawal in assembly, of the shaft 14, bearing carrier 18 and reverse gear 20. An annular clearance 56 is provided in the bell shaped block 22 to receive the thrust hub 16 of propeller shaft 14 to a depth sufficient to unseat the bearing shaft, bearing carrier and reverse gear 14, 18 and 20 in assembly.

The circumferentially uniform pressure exerted between the propeller shaft, by means of washer and nut 48, 50, and the lip 40 of the housing centers the forces along the normal axial position of the propeller shaft and thereby eliminates any cocking tendencies such as results from the use of a slide hammer as previously described.

I claim:

1. A bearing carrier puller for use in removing a bearing carrier in assembly with a propeller shaft and reverse gear from a chamber in a lower unit of a housing of a motor such as an outboard motor, the bearing carrier puller comprising a block having an inner end for seated engagement over an existing annular mouth opening from the chamber in general axial alignment with a through hole in said block, an exteriorly threaded annular sleeve extending loosely axially through said through hole and being of a length to extend from a first end for seated engagement against an existing thrust hub portion of the propeller shaft to a second end terminating a predetermined distance short of a terminal end of a screw threaded end portion of an existing propeller carrying portion of the shaft extending therethrough, whereby a washer and lock nut may be engaged on the threaded end to clamp said sleeve against the thrust hub; an actuating nut, screw threaded on said sleeve outwardly of an outer end of said block, a ring, slip fitted over said threaded sleeve outwardly of said nut, means to fix said ring to said sleeve, and an elongated member fixed to and extending generally outwardly from said ring and being of a length so as to abut an existing fixed housing portion of the motor to arrest rotational movement of said sleeve when said means to fix are engaged and said actuating nut is properly turned to impart longitudinal outward movement to said sleeve.

2. The bearing carrier puller as defined in claim 1 wherein said means to fix comprises at least one set screw threaded through said ring for engagement with said sleeve.

3. The bearing carrier puller as defined in claim 1 including a plurality of concentric grooves formed in said inner end.

4. The bearing carrier puller as defined in claim 1 including a thrust washer interposed between said block outer end and said second nut.

5. The bearing carrier puller as defined in claim 1 including an enlarged axial chamber defined to a predetermined distance inwardly from said inner end to receive said thrust hub when said actuating nut is properly turned.

* * * * *